United States Patent [19]

Chen

[11] Patent Number: 5,096,757
[45] Date of Patent: Mar. 17, 1992

[54] STRUCTURE OF PACKING RUBBER FOR VEHICULAR DOOR FRAME UPPER TRIM

[76] Inventor: Ming-Hsiung Chen, 7F, 16, Alley 3, Lane 227, Nungo-An Street, Taipei, Taiwan

[21] Appl. No.: 602,124

[22] Filed: Oct. 23, 1990

Related U.S. Application Data

[63] Continuation-in-part of Ser. No. 410,757, Sep. 22, 1989, Pat. No. 4,986,169.

[51] Int. Cl.⁵ .......................... E06B 7/16; B29D 12/00
[52] U.S. Cl. ..................................... 428/36.8; 49/489; 49/498; 296/146
[58] Field of Search .................. 98/2.02, 2.13; 52/211; 428/36.8; 296/146; 49/489, 498

[56] References Cited

U.S. PATENT DOCUMENTS 4,707,820 11/1987 Kisanuki ................................ 49/441

Primary Examiner—James J. Seidleck
Assistant Examiner—Charles R. Nold
Attorney, Agent, or Firm—Ladas & Parry

[57] ABSTRACT

A packing rubber for sealing the gap between window glass and door frame upper time of a vehicle of the type comprising a diamond-shaped channel bar having an unitary retainer rib longitudinally disposed at the top for insertion into window glass channel of a door frame of a vehicle and a window glass channel longitudinally disposed at the bottom for holding window glass of a vehicle, which retainer rib defines therein a longitudinal channel hole and comprises a plurality of angle strips disposed longitudinally at the two opposite sides thereof. The packing rubber is squeezed to deform according to the gap between the window glass and the door frame upper trip of the vehicle onto which it is mounted, so that it is firmly retained in place.

1 Claim, 2 Drawing Sheets

STRUCTURE OF PACKING RUBBER FOR VEHICULAR DOOR FRAME UPPER TRIM

BACKGROUND OF THE INVENTION

The present invention is a continuation-in-part of U.S. patent application Ser. No. 07/410,757 filed Sept. 22, 1989 which has now been allowed for issuance as a patent, and is incorporated hereby by reference. In the disclosure of the aforsaid patent application, there is provided a vehicular internal fan ventilator using a packing rubber for sealing the gap between window glass and door frame upper trim of a vehicle. The packing rubber comprises a retainer rib at the top and a window glass channel at the bottom. It is cut into proper size according to the window glass channel of a vehicle to be sealed, and the retainer rib is inserted into the window glass channel of a vehicle to let window glass be lifted to insert into the window glass channel so that the packing rubber becomes firmly retained between window glass and door frame of a vehicle. This structure of packing rubber is still not very satisfactory in use. Because the curvature of the top edge of the window glass of the car doors of a vehicle may vary with one another, gap may be not completely sealed between a window glass and the packing rubber when a window glass is lifted to insert into the window glass channel of the packing rubber. Further, after a window glass is moved down, supporting force to the packing rubber is released and the packing rubber may drop easily due to shaking of a vehicle.

SUMMARY OF THE INVENTION

The present invention has been accomplished under the circumstances in view. It is the main object of the present invention to provide a packing rubber for vehicular window glass channel, which is easy to install, can be firmly retained in place and can efficiently seal the gap between window glass and door frame upper trim of a vehicle.

BRIEF DESCRIPTION OF THE DRAWINGS

The present invention will now be described by way of example only, with reference to the annexed drawings, in which.

DETAILED DESCRIPTION OF THE PREFERRED EMBODIMENT

Figure 2:
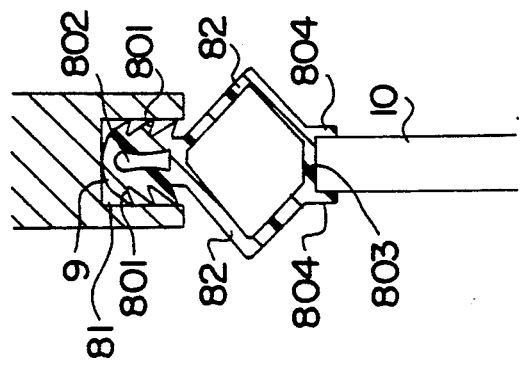
FIG. 2 is a sectional view of the present invention, illustrating the state of the diamond-shaped channel bar being slightly deformed in a wider gap.
Figure 1:
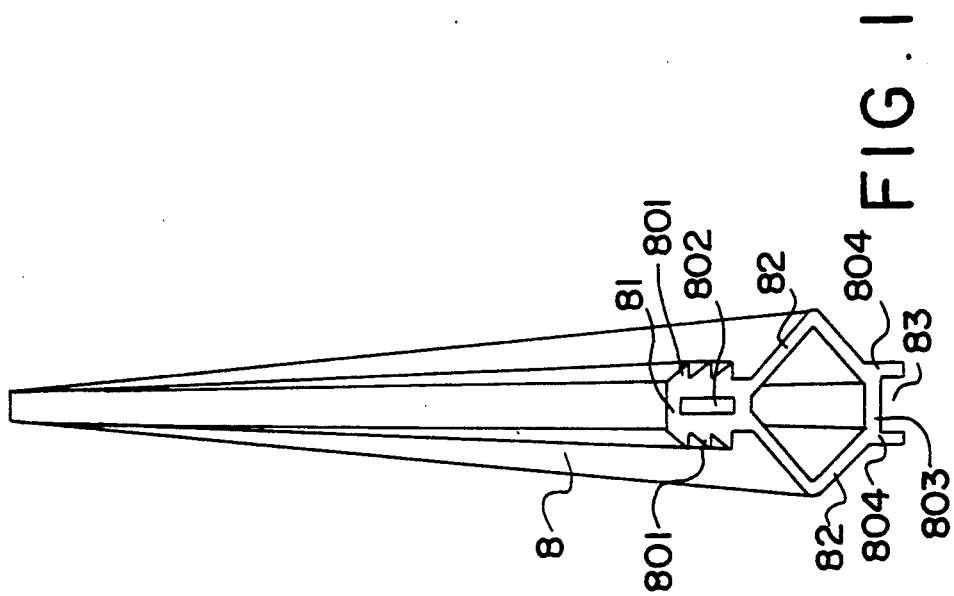
FIG. 1 illustrates the preferred embodiment of packing rubber according to the present invention.

Referring to FIGS. 1 and 2, there is illustrated a packing rubber 8 embodying the present invention. The packing rubber 8 comprises a diamond-shaped channel bar 82 having a retainer rib 81 at the top and a window glass channel 83 at the bottom. When the total length of the window glass channel of a vehicle to be sealed is well measured (see FIG. 5, between points A and B), the packing rubber 8 is cut into proper size and then inserted with its top retainer rib 81 into the window glass channel 9 of the vehicle to be sealed. The retainer rib 81 of the packing rubber 8 defines therein a channel hole 802 and comprises a plurality of angle strips 801 disposed longitudinally at the two opposite sides thereof. Because of the effect of the channel hole 802, the angle strips 801 are simultaneously squeezed inwards downwards inside the window glass channel 9 to firmly stop against the inner wall surface of the window glass channel 9 once the retainer rib 81 is inserted therein. Therefore, no any supporting force is required to support the packing rubber 8 in place.

Figure 3:
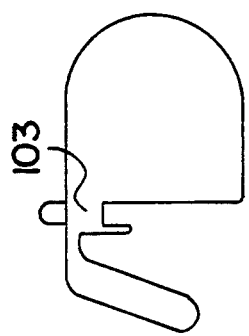
FIG. 3 is a schematic drawing, illustrating the exhaust hole of the air fan.
Figure 4:
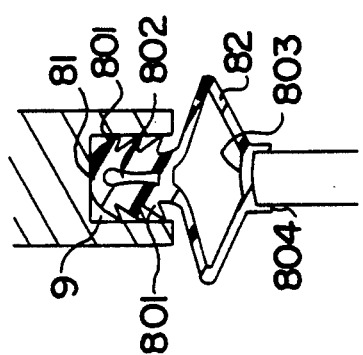
FIG. 4 is a sectional view of the present invention, illustrating the state of the diamond-shaped channel bar being moderately deformed in a medium size of gap.

The diamond-shaped channel bar 82 of the rubber packing 8 is designed to reduce wind resistance during movement of a vehicle, and the window glass channel 83 of which is designed for holding the top edge of a vehicular window glass. After mounting in a vehicular door frame, the total vertical length inside the diamond-shaped channel bar 82 exceeds the outer diameter of the exhaust hole 103 of the air fan installed in a vehicle (see FIG. 3). Therefore, after the packing rubber 8 is fastened in the door frame upper trim of a vehicle and the glass window is lifted to insert into its bottom window glass channel 83, the packing rubber 8 can be firmly retained in the door frame upper trim of a vehicle by means of its tensile force. Further, the width of the window glass channel 83 must be slightly larger than the thickness of the window glass 10 so that the window glass 10 can be inserted therein. When the window glass 10 is lifted to insert into the window glass channel 83, the top wall 803 of the window glass channel 83 is squeezed upward into a curve and, the diamond-shaped channel bar 82 is simultaneously squeezed to deform (as shown in FIG. 4) to further force the two opposite side walls 804 of the window glass channel 83 to bind the glass window 10.

Figure 5:
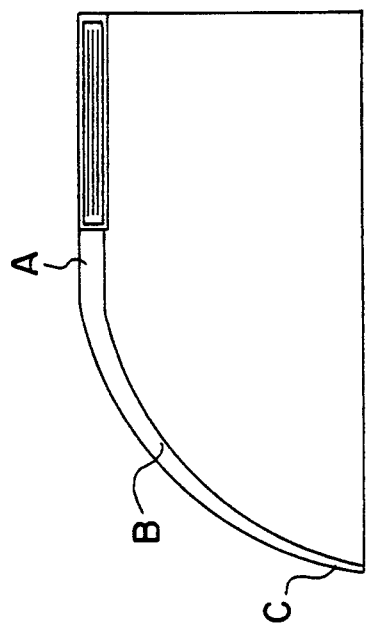
FIG. 5 is a schematic drawing, illustrating the relative positioning of the rubber packing squeezed in between the door frame upper trim and the window glass of a vehicle.
Figure 6:
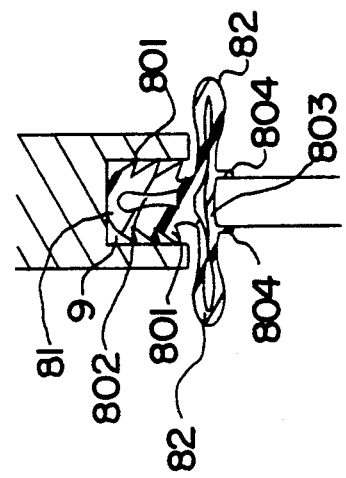
FIG. 6 is a sectional view of the present invention, illustrating the state of the diamond-shaped channel bar being severely deformed in a wider gap.

Referring to FIG. 5, when the glass window 10 is lifted, a gap is left between the glass window 10 and the door frame. This gap may vary with the model of vehicle. When the packing rubber 8 is inserted in the door frame upper trim, it will be squeezed by the glass window 10 to deform, so as to tightly seal the gap. After mounting, the diamond-shaped channel bar 82 of the packing rubber 8 at the area A (see FIG. 5) is squeezed into shape as illustrated in FIG. 2, while the diamond-shaped channel bar 82 at the area B is squeezed into shape as illustrated in FIG. 4 and at the area C is squeezed into a flat shape of thickness less than 3 m/m as illustrated in FIG. 6. Therefore, the packing rubber 8 is variously squeezed to deform according to the size of a gap so as to tightly seal a gap.

What is claimed is:

1. A packing rubber for vehicular door frame upper trim, comprising a diamond-shaped channel bar having an unitary retainer rib longitudinally disposed at the top for insertion into window glass channel of a door frame of a vehicle and a window glass channel longitudinally disposed at the bottom for holding window glass of a vehicle, characterized in that said retainer rib defines therein a longitudinal channel hole and comprises a plurality of angle strips disposed longitudinally at the two opposite sides thereof.

* * * * *